United States Patent [19]

Tsuchiya et al.

[11] 4,085,085
[45] Apr. 18, 1978

[54] CURABLE COATING COMPOSITIONS

[75] Inventors: Shozo Tsuchiya, Kawasaki; Hideo Hayashi, Yokohama; Kazuyoshi Iida; Kiyoshi Goto, both of Tokyo, all of Japan

[73] Assignee: Nippon Oil Company, Limited, Japan

[21] Appl. No.: 754,983

[22] Filed: Dec. 28, 1976

[30] Foreign Application Priority Data

Jan. 1, 1976 Japan .................. 51-329

[51] Int. Cl.² .................. C08L 61/14; C08L 9/00; C08L 29/06
[52] U.S. Cl. .................. 260/38; 204/159.15; 260/59 R; 260/845; 260/848
[58] Field of Search .................. 260/848, 845, 59 R, 260/38

[56] References Cited

U.S. PATENT DOCUMENTS

| | | | |
|---|---|---|---|
| 2,521,359 | 9/1950 | Garber | 260/848 |
| 2,778,806 | 1/1957 | Hutchinson | 260/845 |
| 3,083,174 | 3/1963 | Fefer et al. | 260/848 |
| 3,525,720 | 8/1970 | Wismer et al. | 260/848 |
| 3,538,051 | 11/1970 | Higginbottom | 260/59 R |
| 3,538,052 | 11/1970 | Higginbottom | 260/59 R |
| 3,775,381 | 11/1973 | Hayashi et al. | 260/875 |
| 3,860,670 | 1/1975 | Uhlemayr et al. | 260/848 |
| 3,887,641 | 6/1975 | Tsuchiya et al. | 260/848 |
| 3,969,321 | 7/1976 | Kako et al. | 260/845 |

FOREIGN PATENT DOCUMENTS 1,448,331   9/1976   United Kingdom.

*Primary Examiner*—Murray Tillman
*Assistant Examiner*—A. H. Koeckert
*Attorney, Agent, or Firm*—Bucknam and Archer

[57] ABSTRACT

Curable coating compositions particularly suitable as a vehicle for printing inks, comprising a resin obtained by esterifying with acrylic or methacrylic acid a hydroxyl group-containing resin prepared either by reacting ingredients (A) and (B) to form a reaction mixture which is then reacted with ingredient (C) or by reacting the ingredients (A), (B) and (C). The ingredient (A) is a five-membered cyclic compound having conjugated double bonds or a Diels-Alder's reaction product thereof, the ingredient (B) a compound having both a polymerizable double bond and a hydroxyl group in the molecule and (C) a resol type phenolic resin.

11 Claims, No Drawings

CURABLE COATING COMPOSITIONS

This invention relates to curable coating compositions, particularly those for printing inks, containing a novel resin curable under the action of radiation or heat.

With the recent progress of printing techniques, a high printing speed has been required in the practice of printing. Because of this, it is being required more eagerly that printing inks be dried or cured more rapidly or at a higher drying or curing rate. As a means for accelerating the drying rate in a conventional high-speed printing, a method for drying printed matter by means of direct fire or hot gas heating has been employed. Printing inks used in such heat-set printing contain 30 – 40% of a solvent which is to be evaporated after they are printed. Thus a problem of environmental pollution will often be raised in factories wherein such heat-set printing is carried out since part of the solvent vapor evaporated from the printing inks used is discharged in the factories. Therefore, there have been sought printing inks containing no volatile matter and capable of being dried by the use of any other means than evaporation.

Such being the case, there have already been proposed several inks, such as ultraviolet light or heat curable, solvent-free inks, which may be dried without being accompanied with the evaporation of solvents.

Japanese Patent application No. 18325/73 (Japanese Patent Application Laying-Open No. 124133/74) filed by Nippon Oil Co. Ltd., the assignee from the applicants of the present U.S. application, discloses that a resin prepared by the esterification of a dicyclopentadiene/allyl alcohol copolymer with acrylic or methacrylic acid will exhibit excellent compatibility and cross-linkability when a curable ink containing said resin is prepared. However, it has been found that an offset ink composition containing the resin as disclosed in the aforesaid Application is not necessarily satisfactory in fluidity and emulsification susceptibility to wetting water as an offset ink.

Various studies had been made by the present inventors in an attempt to prepare resins which eliminate the aforesaid various disadvantages and are suitable for use in the preparation of solvent-free curable coating compositions and, as a result of their studies, this invention has been accomplished.

The primary object of this invention is to provide curable coating compositions comprising a novel esterified resin prepared by reacting acrylic and/or methacrylic acid with a hydroxyl group-containing resin prepared from the following ingredients (A), (B) and (C):

(A) (1) at least one five-membered cyclic compound having unsaturated conjugated double bonds, represented by the following general formula

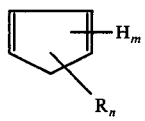

wherein R is an organic residue having 1 – 3 carbon atoms, and m and n are each an integer with the proviso that the sum thereof is 6, (2) at least one Diels-Alder's reaction product of the five-membered cyclic compound (1) or (3) a mixture of the compounds (1) and (2), (B) at least one compound containing both a polymerizable double bond and a hydroxyl group in the molecule, and (C) at least one resol type phenolic resin.

The hydroxyl group-containing resin (II) may be prepared by a method (1) which comprises preliminarily copolymerizing the ingredients (A) and (B) to obtain a copolymer resin (I) and then reacting the thus-obtained (I) with the resinous ingredient (C) or by a method (2) which comprises reacting the ingredients (A), (B) and (C) together at a time under suitable reaction conditions.

The preparation of the resin (II) in accordance with the method (1) will be detailed hereinbelow.

The ingredients (A) and (B) are copolymerized with each other to produce the copolymer (I), the ingredient (A) consisting of at least one member selected from the group consisting of cyclopentadiene, dicyclopentadiene, tricyclopentadiene, tetracyclopentadiene and their lower alkyl substitution products wherein the alkyl has 1 – 3 carbon atoms (such as methyldicyclopentadiene), and the ingredient (B) consisting of at least one member selected from the group consisting of compounds having both a polymerizable double bond and a hydroxyl group in the molecule (such as (meth)allyl alcohol, 2-hydroxyethyl (meth)acrylate and 2-hydroxypropyl (meth)acrylate). The terms "(meth)allyl" and "(meth)acrylate" used herein are intended to mean "allyl and methallyl" and "acrylate and methacrylate", respectively.

The ingredient (A) is hereinafter sometimes referred simply as "dicyclopentadiene" as the representative thereof for the sake of brevity.

The copolymer resin (I) is prepared by reacting the ingredient (A) (dicyclopentadiene) with the ingredient (B) at 150° – 350° C in the presence of a radical polymerization catalyst or without the use of a catalyst and, if desired, in a solvent. The molar ratio of the ingredient (A) to ingredient (B) used in the reaction is from 30 : 70 to 95 : 5, preferably from 40 : 60 to 80 : 20. The copolymer resin (I) is a normally solid one at ambient temperature and may suitably be adjusted in softening point depending upon the purpose for which it is used by the selective use of reaction conditions such as reaction time and temperature in the aforementioned reaction. The resin (I) is usually prepared to have a softening point of 50° – 200° C. It is not necessarily required that the ingredient (A) be highly pure in the preparation of the resin (I). For example, as the ingredient (A), there may be used a fraction containing about 85% of dicyclopentadiene, the fraction being prepared by heating an oil obtained as a by-product by thermocracking naphtha or the like at high temperatures, to thermally dimerize cyclopentadiene and methylcyclopentadiene contained in the $C_5$ fraction of the oil and then distilling the thus-treated oil to remove therefrom the greater part of the $C_5$ fraction such as the $C_5$ olefins and $C_5$ paraffins.

The copolymer resin (I) is then reacted with the resol type phenolic resin (the ingredient (C)) at an elevated temperature to obtain a phenolic resin-modified resin (II). The reaction conditions may be determined as desired. The resin (II) may be prepared by reacting 100 parts of the resin (I) with 1 – 30 parts of the ingredient (C) at 150° – 300° C for 0.5 – 10 hours; the reaction may be effected in a solvent if desired.

The resol type phenolic resin which is the ingredient (C), is a so-called heat curable phenolic resin obtained by condensing formaldehyde and phenol or an alkyl substitution product thereof in the presence of a basic catalyst. The phenol derivatives used herein usually include phenol substituted with an alkyl group having 3 – 6 carbon atoms or with an aryl group; typical of the phenol derivatives are p-tert.-butylphenol, p-n-octylphenol and p-phenylphenol.

The preparation of the resin (II) by the method (2) will be effected as mentioned below.

The ingredients (A), (B) and (C) may be charged into a reactor vessel where they are mixed together and heated to obtain a resin (II) which has substantially the same properties as the resin (II) obtained by the method (1). The reaction conditions may be approximately the same as those of the method (1), and the reaction temperature used may be in the range of 150° – 350° C.

The resin (II) so obtained is then reacted with acrylic and/or methacrylic acid under usual known esterifying conditions (for example, at a temperature of 70° – 150° C, preferably 90° – 130° C for 5 – 20 hr, preferably 7 – 15 hr, in the presence or absence of a suitable catalyst such as sulphuric acid or p-toluenesulfonic acid) to esterify the hydroxyl groups of the resin (II) with the carboxyl groups of the acid to obtain a curable coating resin (III) according to this invention.

This esterifying reaction may be effected by reacting the resin (II) with acrylic and/or methacrylic acid in an amount of 0.5 – 1 mol per mol equivalent of the resin (II); however, there may preferably be used the acid in an amount sufficient to attain substantially perfect esterification. In this case, the use of less than 0.5 mols of the acid will result in the production of esterified resins having lower curability, this being undesirable.

The composition of the essential components of an ink containing the coating resin (III) according to this invention is illustrated below.

1. Ultraviolet curable type ink

| Resin (III) of this invention | 30 – 80 | wt.% |
|---|---|---|
| Pigment | 5 – 30 | wt.% |
| Sensitizer | 3 – 30 | wt.% |

2. The ink may be further incorporated with a solvent in an amount of 40 wt.% or less to prepare therefrom a low viscous ink for use as a high-speed printing ink. In addition, the vehicle present in the ink may contain the solvent in an amount of 50 wt.% or less with the remainder being the resin (III).

If the resin (III) according to this invention is to be used as a vehicle for offset printing inks, it may be modified with a higher fatty acid or rosin further incorporated in the aforesaid esterifying reaction in order to increase the olephilic property of the resin (III).

The curable coating resins (III) according to this invention obtained as previously mentioned are easily curable under the action of heat, ultraviolet light or radiation such as electron beam and are, therefore, very suitable for use as a vehicle for printing inks. The resins have a softening point usually in the range of 30° – 150° C; in cases where they are those having a lower softening point within said range, they when heated will be melted to be made fluid and allow a pigment to be clearly mixed therewith thereby preparing an ink without the use of a solvent, while in cases where they are those having a higher softening point within said range, they may be dissolved in a suitable solvent to form a solution in which a pigment is incorporated thereby preparing an ink. The solvents useful in such case include various known solvents, among which the following reactive solvents are preferable for rapid and easy cure of the ink. The reactive solvents used herein are cross-linkable monomers having at least one reactive double bond which are cross-linkable with the esterified modified resin according to this invention under the action of heat, ultraviolet light or radiation such as electron beam. The monomers may be used singly or jointly as the reactive solvent. The crosslinkable monomers include preferably acrylic acid derivatives and vinylic compounds such as styrene with the acrylic acid derivatives being particularly preferred. The acrylic acid derivatives include pentaerithritol tetra(meth)acrylate, pentaerithritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol di(meth)acrylate, 2-hydroxyethyl (meth)acrylate, 2-hydroxypropyl (meth)acrylate, alkyl (meth)acrylate (the alkyl being a $C_1 - C_{18}$ alkyl), glycidyl (meth)acrylate and other crosslinkable monomers containing at least one acryl or methacrylic residue.

A curable coating composition, in one embodiment of this invention, prepared by dissolving the curable coating resin (III) according to this invention in the aforesaid solvent, is excellent in that it is very rapidly curable due to its crosslinkability under the action of heat or radiation and will exhibit particularly excellent performance when contained in curable offset printing inks. In other words, the curable coating composition when contained in the ink will remarkably improve the ink in fluidity and emulsification susceptibility. The ink compositions wherein the resin (III) according to this invention is used, have been found to be much far improved in fluidity and emulsification susceptibility as compared with those containing a resin prepared by reacting a dicyclopentadiene/allyl alcohol copolymer with acrylic or methacrylic acid as disclosed in Japanese Patent Application Laying-Open Gazette No. 124133/74 for example. At the time of curing of the curable coating composition, the solvent contained therein will be crosslinked thereby to be converted to part of the resulting cured coating without the evaporation thereof and consequently causing environmental pollution.

The curable coating compositions of this invention when intended to be used as a vehicle for printing inks for example, may be incorporated with a cure accelerator in order to further accelerate the curing of the ink, this being recommendable in many cases.

The cure accelerators used herein may be organic peroxides, mixtures thereof with a decomposition accelerator, or certain ketonic resins when the curable coating composition is intended to be cured by heating, or they may be sensitizers such as various benzoin ethers and benzophenone when the composition is intended to be cured by the irradiation of ultraviolet light.

This invention will be better understood by the following Examples wherein all percentages and parts are by weight unless otherwise specified.

EXAMPLE 1

One hundred and thirty-two (132) grams of dicyclopentadiene of 97% purity, 58 g of allyl alcohol and 110 g of commercially available xylenes were charged into an autoclave provided with a stirrer to form a mixture which was then reacted at 260° C for 5 hours. After the end of the reaction, the autoclave was cooled and the reaction product was distilled to remove therefrom the unreacted monomer, low polymers and xylenes thereby obtaining 152 g of a resin (I)-1. One hundred (100) grams of the resin (I)-1 so obtained was incorporated with 5 g of a resol type phenolic resin (produced under the trademark of Hitanol 2501 by Hitachi Kasei Kogyo Co., Ltd., Tokyo) in molten state to form a mixture which was then heated to 200° C for two hours thereby obtaining a resin (II)-1 having a softening point of 103° C and hydroxyl groups in an amount of 0.38 g equivalent/100 g resin.

Eighty (80) parts of the resin (II)-1, 20 parts of acrylic acid, 1.0 part of p-toluenesulfonic acid and 0.1 part of hydroquinone were introduced into a four-necked flask provided with a refluxing condenser and a stirrer to form a mixture which was reacted at 100° C for about 10 hours under reflux of cyclohexane and methyl isobutyl ketone (MIBK) in a ratio by volume of 1 : 1, after which the reaction mixture was heated to 120° C to distil off the cyclohexane and MIBK thereby obtaining a resin (III)-1 having an acid value of 15 and a viscosity of Z (Gardner viscosity being determined by diluting a resin with triallyl isocyanurate in a ratio by weight of resin to isocyanurate of 1 to 2 and then tested for viscosity by the use of a Gardner bubble viscosimeter).

Seventy parts of the resin (III)-1 were dissolved in 30 parts of trimethylolpropane triacrylate to obtain a vehicle (I). A carmine ink A was prepared using the vehicle (I) in accordance with the following formulation.

| Offset carmine ink A | |
| --- | --- |
| Carmine 6B (T) (Trademark) (Monoazo pigment produced by Toyo Ink Mfg. Co.) | 18.0 |
| Vehicle (I) | 66.0 |
| Trimethylolpropane triacrylate | 15.0 |
| Benzophenone | 10.0 |
| 4,4'-bisdiethylaminobenzophenone | 1.0 |

The offset red ink so obtained was printed on art paper by the use of Hidel KORD offset monochrome printer, soon after which the printed art paper was placed on a conveyor and the conveyor with the printed paper placed thereon was passed 13 cm below a 2-KW high pressure mercury lamp H-2000 L (trademark, produced by Tokyo Shibaura Electric Co., Ltd.) having an intensity of 60 W/cm to dry or cure the printed ink by irradiation with ultraviolet light. The results are shown in the following Table 1.

EXAMPLE 2

One hundred and thirty-two grams of dicyclopentadiene of 97% purity, 58 g of allyl alcohol, 10 g of a commercially available resol type phenolic resin (produced under the trademark of Hitanol by Hitachi Kasei Kogyo Co., Ltd., Tokyo) and 100 g of commercially available xylenes were introduced into an autoclave to form a mixture which was reacted at 260° C for 5 hours and then distilled thereby leaving 157 g of a resin (II)-2. The resin (II)-2 so obtained had a softening point of 101° C and an OH group content of 0.36 g equivalent/100 g of resin.

Eighty-one parts of the resin (II)-2, 19 parts of acrylic acid, 1.0 part of p-toluenesulfonic acid and 0.1 part of hydroquinone were reacted together in the same manner as in Example 1 to obtain a resin (III)-2 having an acid value of 140 and a viscosity of $Z_2$. Sixty-five parts of the resin (III)-2 so obtained were dissolved in 35 parts of trimethylolpropane triacrylate to prepare a vehicle (II). A red offset printing ink B was prepared using the vehicle (II) in the same manner as in Example 1. The ink B so prepared was printed and irradiated with ultraviolet light in the same manner as in Example 1. The results are shown in the following Table 1.

EXAMPLE 3

An autoclave was charged with 132 g of dicyclopentadiene of 97% purity, 110 g of 2-hydroxyethyl acrylate and 110 g of a commercially available xylenes to form a mixture which was reacted at 260° C for 5 hours and then distilled thereby leaving 215 g of a resin (I)-3. One hundred grams of the resin (I)-3 were incorporated with 5 g of a commercially available resol type phenolic resin (trademark: Hitanol 2185) in molten state. The resulting mixture was heated to 200° C for 2 hours to obtain a resin (II)-3 having a softening point of 85° C and an OH group content of 0.30 g equivalent/100 g of resin.

Eighty-five grams of the resin (II)-3, 15 parts of acrylic acid, 1.0 part of p-toluenesulfonic acid and 0.1 part of hydroquinone were reacted together in the same manner as in Example 1 thereby to obtain a resin (III)-3 having an acid value of 120 and a viscosity of Y. Seventy-five parts of the resin (III)-3 so obtained were dissolved in 25 parts of pentaerithritol triacrylate to obtain a vehicle (III). A red offset printing ink C was prepared using the vehicle (III) in accordance with the same formulation as in Example 1. The ink C so prepared was printed and irradiated with ultraviolet light. The results are indicated in Table 1.

EXAMPLE 4

A $C_5$ cracked oil fraction (b.p. 28° – 60° C) obtained as a by-product by subjecting naphtha to steam cracking for producing therefrom ethylene, propylene and the like, was heated to 120° C for 4 hours and distilled to distil off the $C_5$ fraction thereby to recover a fraction containing 85% of dicyclopentadiene (DCPD) and the balance comprising co-dimers of cyclopentadiene and isoprene or piperylene, and the like. An autoclave was charged with 160 g of the thus-recovered fraction containing 85% of DCPD, 29 g of allyl alcohol, 72 g of 2-hydroxypropyl methacrylate, 12 g of a commercially available resol type phenolic resin (Hitanol 2180, trademark) and 90 g of benzene to form a mixture which was heated to 270° C for 4 hours to distil off the unreacted monomers, low polymers, solvent and the like thereby to obtain 210 g of a resin (II)-4 having a softening point of 97° C and an OH group content of 0.40 g equivalent/100 g of resin.

Seventy-eight parts of the resin (II)-4 so obtained, 22 parts of acrylic acid, 1.0 part of p-toluenesulfonic acid and 0.1 part of hydroquinone were reacted together in the same manner as in Example 1 to obtain a resin (III)-4 having an acid value of 170 and a viscosity of YZ. Seventy-five parts of the resin (III)-4 were dissolved in 25 parts of hexanediol diacrylate to obtain a vehicle of (IV). A red offset printing ink D was prepared using the vehicle (IV) in accordance with the same formulation as in Example 1. The ink D was printed and irradiated with ultraviolet light in the same manner as in Example 1 with the results being indicated in Table 1.

EXAMPLE 5

Seventy-seven parts of the resin (II)-4 as obtained in Example 4, 23 parts of methacrylic acid, 1.0 part of p-toluenesulfonic acid and 0.1 part of hydroquinone were reacted together in the same manner as in Example 1 thereby to obtain a resin (III)-5 having an acid value of 19.0 and a viscosity of Z. There was obtained a vehicle (V) by dissolving 70 parts of the resin (III)-5 in 30 parts of hexanediol diacrylate. A red offset ink E was prepared using the vehicle (V) in accordance with the same formulation as in Example 1. The ink E so prepared was printed and irradiated with ultraviolet light in the same manner as in Example 1.

Comparative example 1

Eighty parts of the resin (I)-1 as obtained in Example 1, 20 parts of acrylic acid, 1.0 part of p-toluenesulfonic acid and 0.1 part of hydroquinone were reacted together as in Example 1 thereby to obtain a resin (IV) having an acid value of 14.0 and a viscosity of $ZZ_1$. There was a vehicle (VI) by dissolving 70 parts of the thus-obtained resin (IV) in 30 parts of trimethylolpropane triacrylate. A red offset printing ink F was prepared using the vehicle (VI) in the same manner as in Example 1. The ink F was printed and then irradiated with ultraviolet light in the same manner as in Example 1. The results are shown in Table 1.

Comparative example 2

Eighty-six parts of the resin (I)-3 as obtained in Example 3, 14 parts of acrylic acid, 1.0 part of p-toluenesulfonic acid and 0.1 part of hydroquinone were reacted together in the same manner as in Example 1 thereby to obtain a resin (V) having an acid value of 11.0 and a viscosity of YZ. Seventy-five parts of the resin (V) were dissolved in 25 parts of pentaerithritol triacrylate to produce a vehicle (VII). A red offset printing ink G was prepared using the vehicle (VII) in accordance with the same formulation as used in Example 1. The ink G was printed and irradiated with ultraviolet light in the same manner as in Example 1. The results are shown in Table 1.

What is claimed is:

1. A curable coating composition comprising a resin obtained by reacting the following ingredients (A), (B) and (C)
    (A) at least one member selected from the group consisting of (1) five-membered cyclic compounds having unsaturated conjugated double bonds, represented by the following general formula

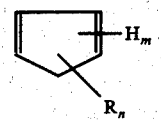

wherein R is an organic residue having 1 – 3 carbon atoms, and $m$ and $n$ are each an integer with the proviso that the sum thereof is 6 and (2) Diels-Alder's products of the five-membered cyclic compounds (1)
    (B) at least one compound containing both a polymerizable double bond and a hydroxyl group in the molecule, and
    (C) at least one resol type phenolic resin, to produce a hydroxyl group-containing resin, and then reacting the thus-produced hydroxyl group-containing resin with a member selected from the group consisting of acrylic and methacrylic acids.

2. A curable coating composition according to claim 1, wherein the ingredients (A) and (B) are reacted with each other to form a reaction mixture which is then reacted with the ingredient (C).

3. A curable coating composition according to claim 1, wherein the ingredients (A), (B) and (C) are reacted together at a time.

4. A curable coating composition according to claim 1, wherein the curable coating composition is curable under the action of heat or radiation.

5. A curable coating composition according to claim 1, further comprising a pigment and sensitizer in addition to the curable coating composition as a vehicle.

6. A curable coating composition according to claim 5, further comprising a solvent.

Table 1

|  | Curability of ink (Note 1) | Gloss of print | Emulsification susceptibility (Note 2) | Printability (Note 3) |
|---|---|---|---|---|
| Example 1 | 28m/min. | Satisfactory | 24% | 10000 paper sheets were printed with ink successfully without any troubles. |
| Example 2 | 30m/min. | Satisfactory | 26% | " |
| Example 3 | 25m/min. | Somewhat unsatisfactory | 23% | After having printed 8000 paper sheets with ink, resin and pigment tended to remain on printing plate and blanket thereby aggravating transferability of ink with the result that satisfactory prints were obtained no more. |
| Example 4 | 32m/min. | Satisfactory | 26% | 10000 paper sheets were printed with ink successfully without troubles. |
| Example 5 | 15m/min. | Satisfactory | 24% | " |
| Comparative example 1 | 25m/min. | Somewhat unsatisfactory | 18% | After having printed 700 paper sheets with ink, resin and pigment tended to remain on printing plate and blanket thereby aggravating transferability of ink with the result that satisfactory prints were obtained no more. |
| Comparative example 2 | 20m/min. | Unsatisfactory | After having printed 500 paper sheets 16% | with ink, the same undesirable phenomena as above were appreciated. |

(Note 1) Curability (drying rate) of ink as determined by finger touch method was expressed in terms of conveyor travelling speed required for effecting cure or drying of the ink.
(Note 2) Ratio (%) between the maximum amount of water emulsifiable in ink and the total amount of the water and ink.
(Note 3) Printing was effected at a printing rate of 4000 paper sheets/hr with the use of PS plate by using a Hidel KORD monochrome printer.

7. A curable coating composition according to claim 5, wherein are contained 30 – 80% by weight of the acid-modified resin as the vehicle, 5 – 30% by weight of a pigment and 3 – 30% by weight of a sensitizer.

8. A curable coating composition according to claim 6, wherein not more than 40% by weight of the solvent is contained.

9. A curable coating composition according to claim 1, wherein the ingredient (A) consists of at least one member selected from the group consisting of cyclopentadiene, dicyclopentadiene, tricyclopentadiene, tetracyclopentadiene and those substituted with a lower alkyl having 1 to 3 carbon atoms.

10. A curable coating composition according to claim 1, wherein the ingredient (B) consists of at least one member selected from the group consisting of (meth)allyl alcohol, 2-hydroxyethyl (meth)acrylate and 2-hydroxypropyl (meth)acrylate.

11. A curable coating composition according to claim 1, wherein the ingredient (C) is a heat curable phenolic resin prepared by condensing formaldehyde and phenol or its alkyl substitution product in the presence of a basic catalyst.

* * * * *

UNITED STATES PATENT OFFICE
CERTIFICATE OF CORRECTION

Patent No. 4,085,085   Dated 4-18-78

Inventor(s) SHOZO TSUCHIYA, ET AL

It is certified that error appears in the above-identified patent and that said Letters Patent are hereby corrected as shown below:

ASSIGNEE - NIPPON OIL CO., LTD. and
TOYO INK MANUFACTURING CO., LTD.

Signed and Sealed this

Ninth Day of January 1979

[SEAL]

Attest:

RUTH C. MASON
Attesting Officer

DONALD W. BANNER
Commissioner of Patents and Trademarks